(12) United States Patent
Tsau

(10) Patent No.: US 6,641,317 B1
(45) Date of Patent: Nov. 4, 2003

(54) DRAINING STRUCTURE FOR A KEYBOARD

(75) Inventor: Yong Te Tsau, Taipei (TW)

(73) Assignee: Behavior Tech Computer Corporation, Taipei (TW)

(*) Notice: Subject to any disclaimer, the term of this patent is extended or adjusted under 35 U.S.C. 154(b) by 0 days.

(21) Appl. No.: 10/124,234

(22) Filed: Apr. 18, 2002

(51) Int. Cl.[7] .................................. B41J 5/10
(52) U.S. Cl. ................... 400/496; 400/472; 200/302.1
(58) Field of Search ........................ 400/472, 496; 200/302.1, 302.2; 341/22

(56) References Cited

U.S. PATENT DOCUMENTS

| | | | | |
|---|---|---|---|---|
| 4,905,173 A | * | 2/1990 | Bianco | 361/680 |
| 4,948,281 A | * | 8/1990 | Werner | 400/472 |
| 5,421,659 A | * | 6/1995 | Liang | 400/472 |
| 6,156,983 A | * | 12/2000 | Chen et al. | 200/302.1 |
| 6,179,500 B1 | * | 1/2001 | Oura et al. | 400/693 |
| 6,443,644 B1 | * | 9/2002 | Takeda et al. | 400/490 |

* cited by examiner

Primary Examiner—Andrew H. Hirshfeld
Assistant Examiner—Dave A. Ghatt
(74) Attorney, Agent, or Firm—Rosenberg, Klein & Lee

(57) ABSTRACT

A draining structure for keyboard an upper cover having a top surface forming a number of recessed areas for accommodation of movable pushbuttons. A lower cover is releasable attached to a bottom side of the upper cover. Each recessed area has at least one draining hole, preferably in the form of an elongated slot defined in a sidewall of the recessed area. The lower cover forms a groove corresponding in position to the draining holes of the upper cover for receiving liquid from the recessed areas of the upper cover via the draining holes. A number of openings or elongated slots is defined in the bottom of the groove for expelling the liquid out of the casing. A partition wall is formed in the lower cover for separating the groove from an electric part receiving space in which electric parts are arranged for preventing electric short caused by the liquid contacting the electric parts.

7 Claims, 3 Drawing Sheets

DRAINING STRUCTURE FOR A KEYBOARD

BACKGROUND OF THE INVENTION

1. Field of the Invention

The present invention generally relates to a keyboard, such as a computer keyboard, and in particular to a casing of a keyboard having a draining structure to drain liquid accidentally poured into the inside of the keyboard casing.

2. The Related Art

Keyboards are one of the most commonly employed computers input devices or man-machine interfaces. The keyboard comprises a casing inside which electric circuits and parts are arranged. Movable pushbuttons are provided on a top surface of the casing for user's access and actuation. A stroke of any one of the pushbuttons causes a physical contact between separate parts of the circuit to induce an electric signal corresponding to the pushbutton. Due to the moving parts of the pushbuttons, gaps are formed in the top surface of the keyboard casing. Liquids, such as water and soft drinks that are accidentally poured onto the keyboard may flow into the keyboard casing via the gaps and cause electric short of the circuit of the keyboard.

Thus, it is desired to provide a draining structure for keyboard in order to reduce and even eliminate the problems caused by liquid poured into the keyboard casing.

SUMMARY OF THE INVENTION

An object of the present invention is to provide a draining structure for a keyboard comprising a draining structure for guiding liquid that is accidentally poured into the keyboard casing out of the casing to eliminate electric short caused by the liquid contacting a circuit board or electric parts of the keyboard.

To achieve the above object, in accordance with the present invention, there is provided a draining structure for a keyboard comprising an upper cover having a top surface forming a number of recessed areas for accommodation of movable pushbuttons. A lower cover is releasable attached to a bottom side of the upper cover. Each recessed area has at least one draining hole, preferably in the form of an elongated slot defined in a sidewall of the recessed area. The lower cover forms a groove corresponding in position to the draining holes of the upper cover for receiving liquid from the recessed areas of the upper cover via the draining holes. A number of openings or elongated slots is defined in the bottom of the groove for expelling the liquid out of the casing. A partition wall is formed in the tower cover for separating the groove from an electric part receiving space in which electric parts are arranged for preventing electric short caused by the liquid contacting the electric parts.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
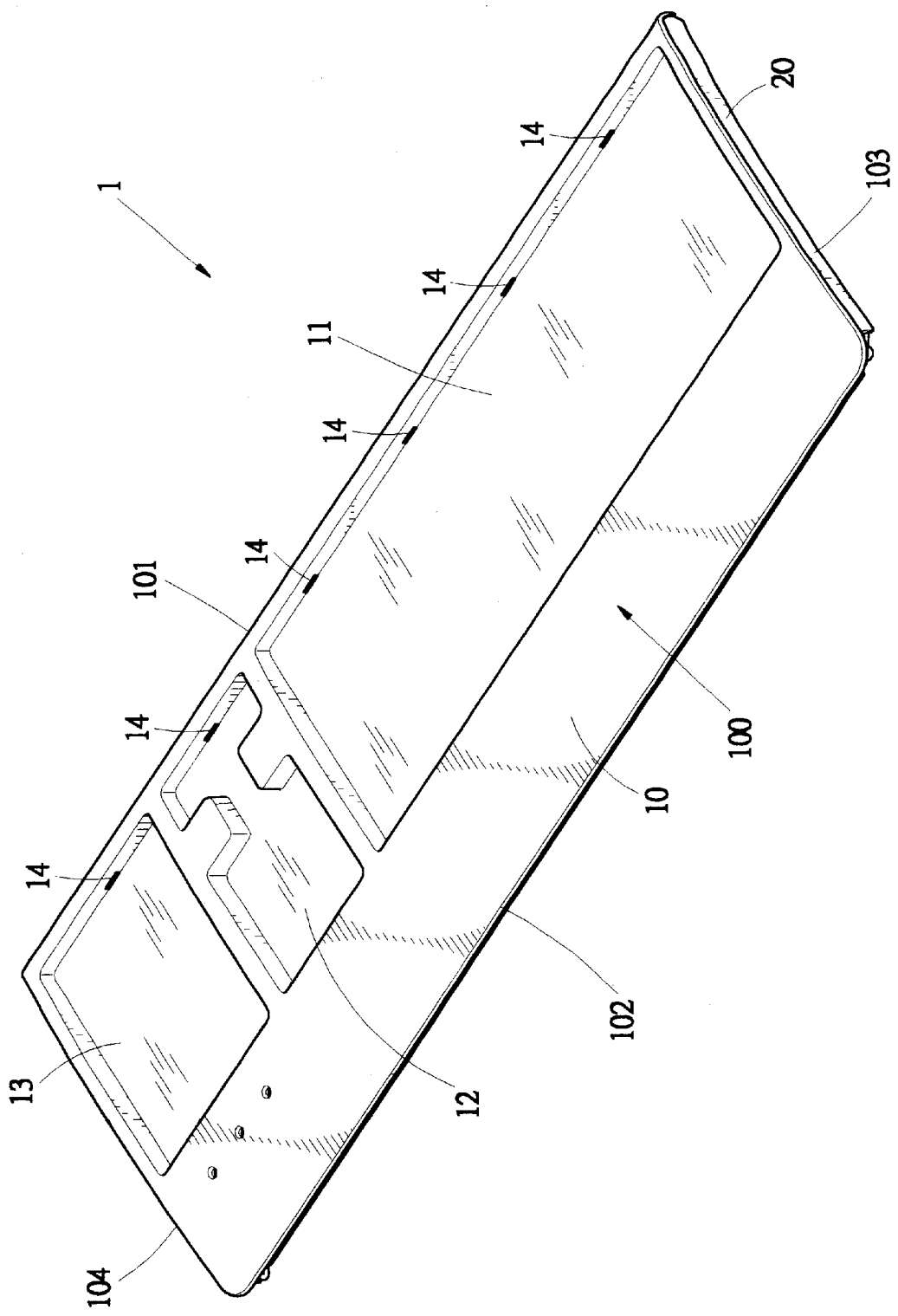
FIG. 1 is a perspective view of a draining structure for keyboard constructed in accordance with the present invention.
Figure 2:
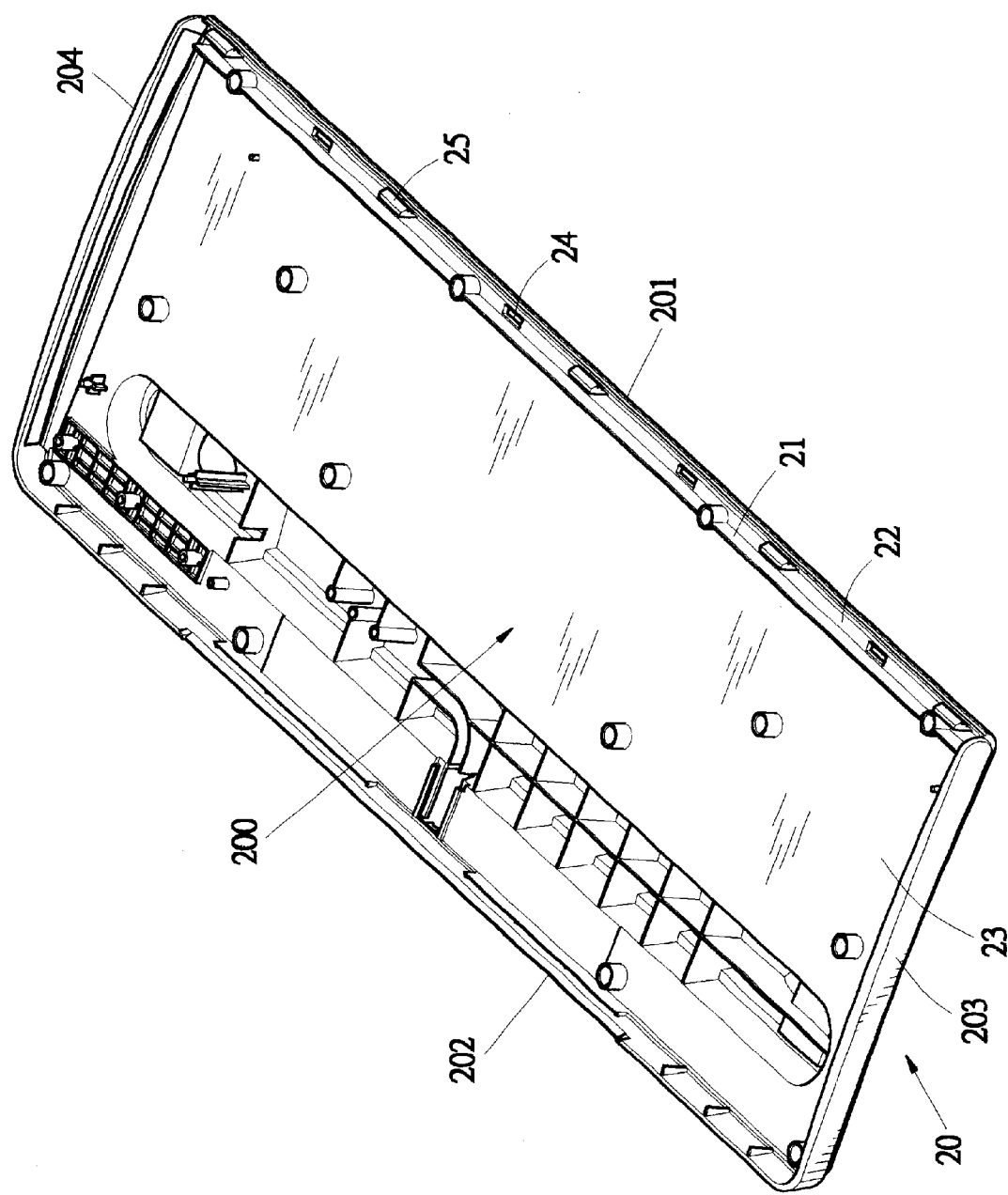
FIG. 2 is a perspective view of a lower cover of the draining structure for keyboard of the present invention.

With reference to the drawings and in particular to FIGS. 1 and 2, a keyboard casing 1 constructed in accordance with the present invention generally comprises a cover or upper cover 10 releasable mounted to a base or lower cover 20. The upper cover 10 has a top surface 100, a proximal edge 101, a distal edge 102, a left edge 103 and a right edge. The lower cover 20 also has a top surface 200, a proximal edge 201, a distal edge 202, a left edge 203 and a right edge 204 respectively. Therefore, the upper cover 10 and the lower cover 20 can be engaged together. The top surface 100 of the upper cover 10 has a number of recessed areas 11, 12, 13 defined for accommodation of movable pushbuttons (not shown). The pushbuttons are movable with respect to the casing for actuation of a circuit arranged inside the casing. Each recessed area 11, 12, 13 is defined by sidewalls (not labeled) substantially perpendicular to the top surface of the upper cover 10 and a bottom (not labeled). At least an opening or draining hole 14 is defined in at least one sidewall of each recessed area 11, 12 13. In the embodiment illustrated, the draining holes 14 are defined in a root edge of one side wall of each recessed area 11, 12, 13 that is adjacent the bottom of the recessed area 11, 12, 13. The recessed areas 11, 12 each have one draining hole 14 and the recessed area 13 has four draining holes 14. Preferably, the draining holes 14 are elongated.

If desired, the draining holes 14 may be defined in the bottom of each recessed area 11, 12, 13.

The lower cover 20 comprises a partition wall 21 separating an electric part receiving space 23 in which a circuit and electric parts (both not shown) of the keyboard are arranged from a groove 22. The groove 22 is arranged to be corresponding to the draining holes 14 of the upper cover 10 in position whereby liquid draining through the draining holes 14 is collected in the groove 22. The partition wall 21 prevents the liquid from undesirably flowing from the groove 22 into the electric part receiving space 23 to cause electric short and malfunction thereof. A number of openings 24 are defined in bottom of the groove 22 for expelling the liquid that is collected in the groove 22 out of the casing. Preferably, the openings 24 are elongated slots substantially equally spaced along the groove 22.

Preferably, the groove 22 extends along an edge (not labeled) of the lower cover 20. Further preferably, the partition wall 21 is co-extensive with the groove 22.

Figure 3:
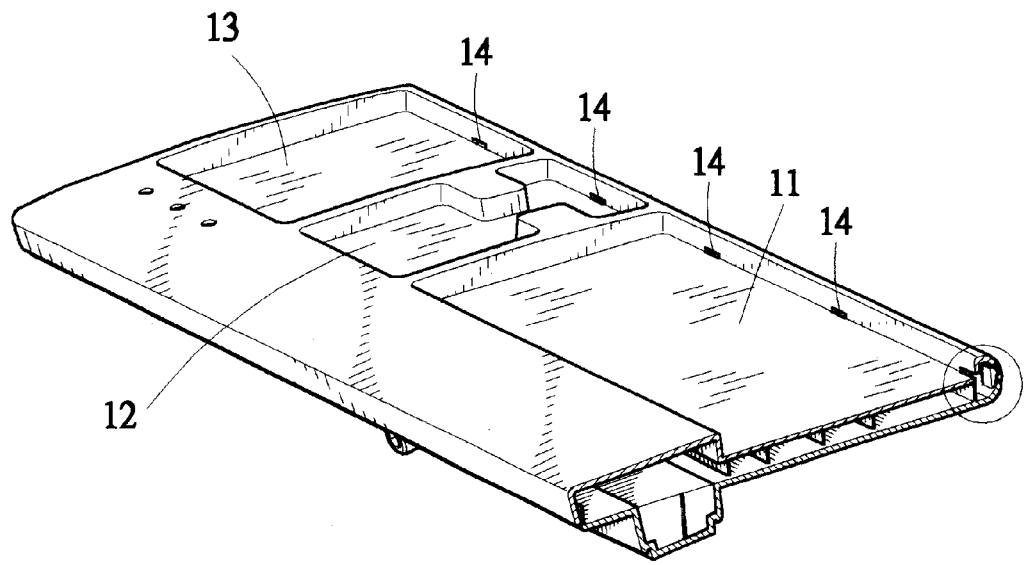
FIG. 3 is another perspective view of the draining structure for keyboard of the present invention with a edge thereof taken away to show inside structure thereof.
Figure 4:
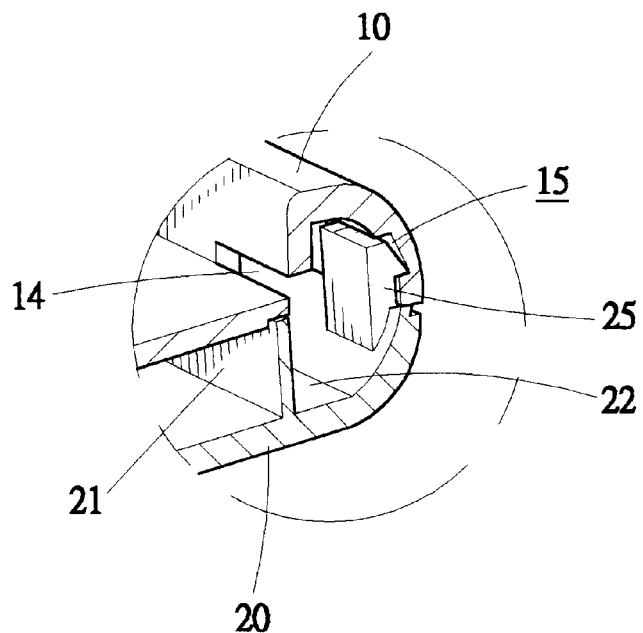
FIG. 4 is an enlarged view of the encircled edge of FIG. 3.

Also referring to FIGS. 3 and 4, a number of resilient arms 25 having barbed ends (not labeled) is formed on the lower cover 20 for engaging slots 15 defined in the upper cover 10 to releasably attach the lower cover 20 to a lower side of the upper cover 10. Additional fasteners (not shown), such as bolts, may be used to further secure the upper and lower covers 10, 20 together.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A draining structure for a keyboard comprising:

an upper cover having a pair of side edge portions and an intermediate portion extending longitudinally therebetween, said intermediate portion having at least one recessed area for accommodating a plurality of keys, said intermediate portion having formed therein at least one first draining hole disposed in open communication with at least one said recessed area; and, a lower cover detachably coupled to extend longitudinally along said upper cover, said lower cover having side edge portions engaging said side edge portions of said upper cover, said lower cover having formed to extend longitudinally between said side edge portions thereof an elongate groove disposed in open communication with said first draining hole of said upper cover, said elongate groove being configured to collect and guide liquid passing through said first draining hole, said lower cover having formed in said elongate groove at least one second draining hole for draining the collected liquid therefrom.

2. The draining structure for a keyboard as recited in claim 1 wherein said recessed area is defined by at least one sidewall, said first draining hole being formed in said sidewall.

3. The draining structure for a keyboard as recited in claim 2 wherein said sidewall extends upward from a bottom surface of said recessed area, said first draining hole being formed at a base of said sidewall adjacent said bottom surface.

4. The draining structure for a keyboard as recited in claim 1 wherein said second draining hole is longitudinally elongated in contour.

5. The draining structure for a keyboard as recited in claim 1 wherein said lower cover defines an intermediate electric part receiving space, and includes a partition wall extending longitudinally along to separate said elongate groove from said electric part receiving space.

6. The draining structure for a keyboard as recited in claim 1 wherein said elongate groove extends peripherally along said lower cover, and said lower cover has formed therein a plurality of said second draining holes spaced in equidistant manner along said elongate groove.

7. The draining structure for a keyboard as recited in claim 1 wherein one of said upper and lower covers has formed therein a plurality of openings, and the other of said upper and lower covers has formed thereon a plurality of resilient arms having barbed ends for respectively engaging said openings.

* * * * *